US007571347B2

(12) United States Patent
Gross et al.

(10) Patent No.: US 7,571,347 B2
(45) Date of Patent: Aug. 4, 2009

(54) METHOD AND APPARATUS FOR PROVIDING FAULT-TOLERANCE IN PARALLEL-PROCESSING SYSTEMS

(75) Inventors: Kenny C. Gross, San Diego, CA (US); Alan P. Wood, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 448 days.

(21) Appl. No.: 11/385,429

(22) Filed: Mar. 20, 2006

(65) Prior Publication Data

US 2007/0220298 A1    Sep. 20, 2007

(51) Int. Cl.
    *G06F 11/00*    (2006.01)
(52) U.S. Cl. .......................................... 714/15; 714/13
(58) Field of Classification Search ........................ None
    See application file for complete search history.

(56) References Cited

U.S. PATENT DOCUMENTS

| 5,664,090 | A * | 9/1997 | Seki et al. ..................... 714/15 |
| 5,712,971 | A * | 1/1998 | Stanfill et al. .................. 714/34 |
| 2005/0114739 | A1 * | 5/2005 | Gupta et al. ................... 714/39 |
| 2006/0168473 | A1 * | 7/2006 | Sahoo et al. ................... 714/15 |
| 2007/0168715 | A1 * | 7/2007 | Herz et al. ..................... 714/13 |

OTHER PUBLICATIONS

Plank, James S., "ickp: A Consistent Checkpointer for Multicomputers", 1994, IEEE.*
Cao et al., "Design and Analysis of An Efficient Algorithm for Coordinated Checkpointing in Distributed Systems", 1997, IEEE.*
Li et al., "Low-Latency, Concurrent Checkpointing for Parallel Programs", 1994, IEEE.*
Kim et al., "An Efficient Protocol for Checkpointing Recovery in Distributed Systems", 1993, IEEE.*

* cited by examiner

*Primary Examiner*—Gabriel L Chu
(74) *Attorney, Agent, or Firm*—Park, Vaughan & Fleming LLP

(57) ABSTRACT

A system that provides fault tolerance in a parallel processing system. During operation, the system executes a parallel computing application in parallel across a subset of computing nodes within the parallel processing system. During this process, the system monitors telemetry signals within the parallel processing system. The system analyzes the monitored telemetry signals to determine if the probability that the parallel processing system will fail is increasing. If so, the system increases the frequency at which the parallel computing application is checkpointed, wherein a checkpoint includes the state of the parallel computing application at each computing node within the parallel processing system.

15 Claims, 2 Drawing Sheets

US 7,571,347 B2

METHOD AND APPARATUS FOR PROVIDING FAULT-TOLERANCE IN PARALLEL-PROCESSING SYSTEMS

BACKGROUND

1. Field of the Invention

The present invention relates to techniques for providing fault-tolerance in parallel-processing systems.

2. Related Art

High-performance computing (HPC) applications often use message-passing techniques, such as the Message Passing Interface (MPI) technique, to facilitate executing distributed parallel-computing applications. The MPI technique allows computationally-intensive and memory-intensive jobs to be decomposed into smaller problems which are executed in parallel across a number of computing nodes.

For example, a problem can be decomposed into N "chunks," and the chunks can be distributed across N computing nodes to be processed in parallel, thereby decreasing the execution time of the distributed parallel-computing application by a factor of approximately N (less the overhead due to inter-process communications and the overhead for combining the processed chunks). Unfortunately, one drawback of existing message-passing techniques for parallel-computing applications is that they lack a fault-tolerance mechanism. Consequently, if one of the computing nodes fails before all of the chunks complete, the entire parallel-processing job needs to be restarted from the beginning.

One solution to this fault-tolerance problem is to use checkpointing to save the state of the parallel-computing problem into memory and/or disk at regular intervals (at some frequency F). The frequency, F should be selected with care because the checkpointing operation imposes a nontrivial overhead penalty on the execution time of the distributed parallel-computing application. If a checkpoint is taken too frequently, it is possible to mitigate the speedup gains that result from parallel-computing. On the other hand, if a checkpoint is taken too infrequently, there is an increased likelihood of losing data that has been computed since the last checkpoint was taken.

Hence, what is needed is a method and an apparatus for improving fault-tolerance in a parallel-processing system without the problems described above.

SUMMARY

One embodiment of the present invention provides a system that facilitates fault tolerance in a parallel-processing system. During operation, the system executes a parallel-computing application in parallel across a subset of computing nodes within the parallel-processing system. During this process, the system monitors telemetry signals within the parallel-processing system. The system analyzes the monitored telemetry signals to determine if the probability that the parallel-processing system will fail is increasing. If so, the system increases the frequency at which the parallel-computing application is checkpointed, wherein a checkpoint includes the state of the parallel-computing application at each computing node within the parallel-processing system.

In a variation on this embodiment, while analyzing the monitored telemetry signals to determine if the probability that the parallel-processing system will fail is increasing, the system (1) uses the monitored telemetry signals to generate a health index, which indicates the risk that the parallel-processing system will fail, and (2) determines if the health index indicates that the probability that the parallel-processing system will fail is increasing.

In a further variation, while increasing the frequency at which the parallel-computing application is checkpointed, the system increases the frequency by a factor which is inversely proportional to the value of the health index.

In a further variation, prior to executing the parallel-computing application, the system initializes the health index to 1, which indicates that the parallel-processing system is healthy, wherein the probability that the parallel-processing system will fail increases as the health index approaches 0.

In a variation on this embodiment, the system determines if a checkpoint time interval has elapsed. If so, the system performs a checkpointing operation to save the state of the distributed parallel-computing application.

In a variation on this embodiment, if the parallel-processing system fails, the system uses the checkpoint to restore the state of the parallel-processing system to the state of the last checkpoint, and resumes execution of the parallel-computing application from the restored state.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), random-access memory (RAM), and read-only memory (ROM).

Overview

One embodiment of the present invention uses data gathered for proactive fault-monitoring purposes to reduce the overhead penalty associated with taking a checkpoint for a parallel-computing application.

In one embodiment of the present invention, if the parallel-processing system has a low risk of failure, a lower checkpointing frequency is used. Note that without proactive fault-monitoring, the health of the parallel-processing system is unknown; hence, a more conservative (i.e. higher) checkpointing frequency is used. In contrast, by monitoring continuous-system telemetry signals and using proactive fault-monitoring, a higher job throughput can be achieved when the parallel-processing system is healthy, and a higher-level of fault-tolerance can be achieved when the fault-monitoring mechanism indicates the onset of a system failure.

Parallel-Processing System

Figure 1:
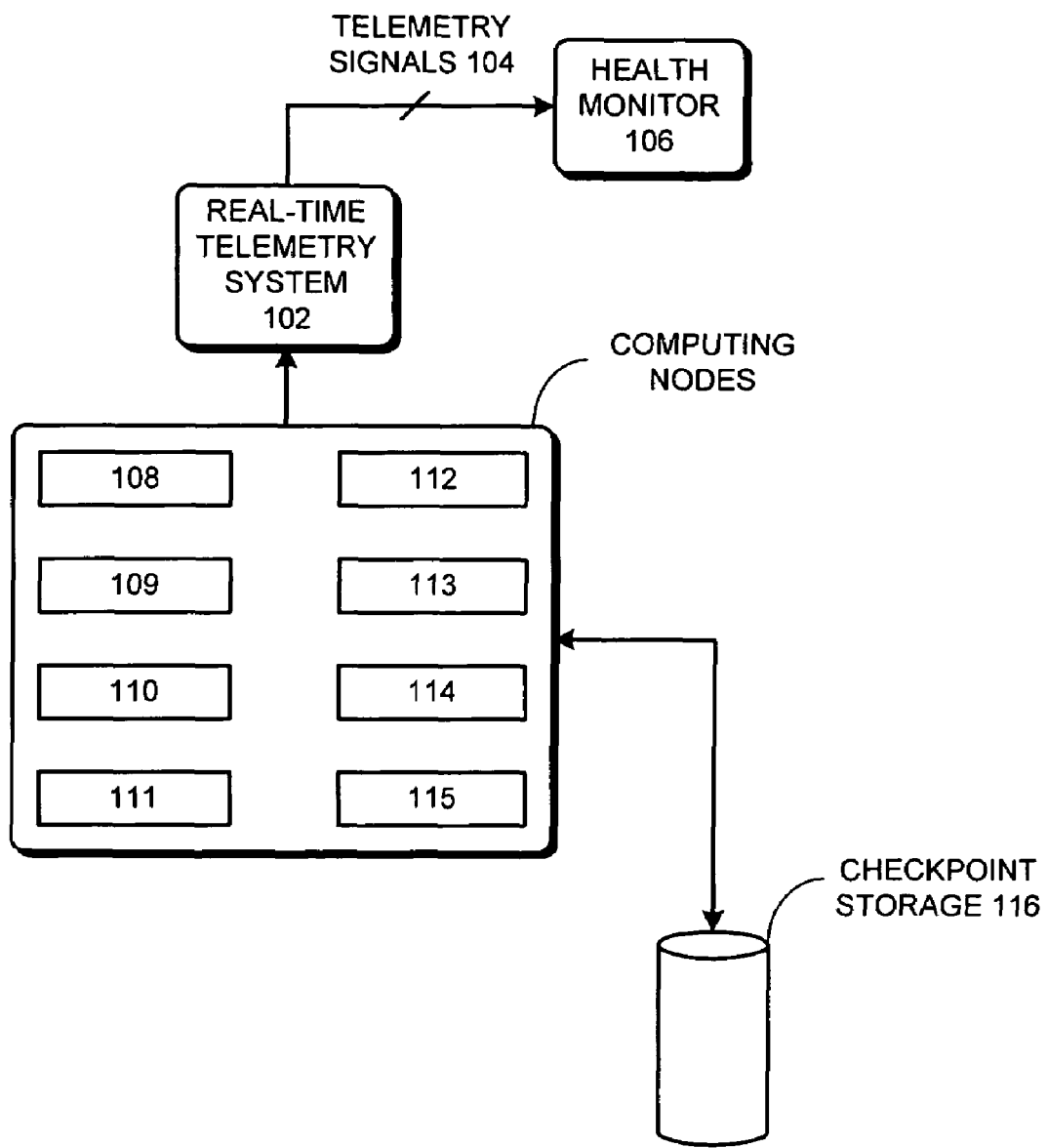
FIG. 1 presents a block diagram of a parallel-processing system in accordance with an embodiment of the present invention.

FIG. 1 presents a block diagram of parallel-processing system 100 in accordance with an embodiment of the present invention. Parallel-processing system 100 includes real-time telemetry system 102, telemetry signals 104, health monitor 106, computing nodes 108 to 115, and checkpoint storage device 116.

During operation, real-time telemetry system 102 gathers information from the various sensors and monitoring tools within parallel-processing system 100, and directs the resulting telemetry signals 104 to a local or to a remote location that contains health monitor 106. Note that the telemetry signals gathered by real-time telemetry system 102 can include hardware variables and/or software variables. The software variables can include: load metrics, CPU utilization, idle time, memory utilization, disk activity, transaction latencies, and other performance metrics reported by the operating system. The hardware variables can include: temperature, voltage, and other physical parameters.

Each of the computing nodes 108-115 in parallel-processing system 100 can contain one or more processors. In one embodiment of the present invention, each computing node contains four processors. Note that the processors can include any type of processor, including, but not limited to, a microprocessor, a mainframe computer, a digital signal processor, a personal organizer, a device controller and a computational engine within an appliance. Also note that although parallel-processing system 100 illustrated in FIG. 1 contains eight computing nodes, the number of computing nodes can vary depending on the computing requirements.

When parallel-processing system 100 takes a checkpoint for a parallel-computing application, it saves the state of the parallel-computing application at each computing node within parallel-processing system 100 to checkpoint storage device 116.

Note that checkpoint storage device 116 can include any type of volatile or non-volatile storage device that can be coupled to a computer system. This includes, but is not limited to, magnetic, optical, and magneto-optical storage devices, as well as storage devices based on flash memory, battery-backed up memory, and random-access memory (RAM). Furthermore, note that multiple redundant copies of the checkpoint can be stored on multiple types of storage devices or multiple redundant copies of the checkpoint can be stored multiple times on a single storage device.

SPRT (Sequential Probability Ratio Test)

One embodiment of the present invention uses a Sequential Probability Ratio Test (SPRT) to generate alarms when components within the parallel-processing system show signs of degradation. The frequency with which the alarms occur is used to determine the health of the parallel processing system.

An SPRT is a statistical hypothesis test that differs from standard fixed sample tests. In fixed-sample statistical tests, a given number of observations are used to select one hypothesis from one or more alternative hypotheses. The SPRT, however, examines one observation at a time, and then makes a decision as soon as it has sufficient information to ensure that pre-specified confidence bounds are met.

The basic approach taken by the SPRT technique is to analyze successive observations of a discrete process. Let $y_n$ represent a sample from the process at a given moment $t_n$ in time. In one embodiment of the present invention, the sequence of values $\{Y_n\} = y_0, y_1, \ldots, y_n$ comes from a stationary process characterized by a Gaussian, white-noise probability density function (PDF) with mean 0. (Note that since the sequence originates from a nominally stationary process, any process variables with a nonzero mean can be first normalized to a mean of zero with no loss of generality).

The SPRT is a binary hypothesis test that analyzes process observations sequentially to determine whether or not the signal is consistent with normal behavior. When a SPRT reaches a decision about current process behavior (i.e. the signal is behaving normally or abnormally), the system reports the decision and continues to process observations.

In one embodiment of the present invention, six types of SPRT tests are used to monitor the health of the parallel-processing system. For each of the six types of tandem SPRT tests described below, the signal data adheres to a Gaussian PDF with mean 0 and variance $\sigma^2$ for normal signal behavior, referred to as the null hypothesis, $H_0$. The system computes six specific SPRT hypothesis tests in parallel for each inferential variable monitored.

One embodiment of the present invention applies a SPRT to an electrical current time-series. Other embodiments of the present invention apply a SPRT to other inferential variables, including voltage, internal temperature, or stress variables.

The SPRT surveillance module executes all 6 tandem hypothesis tests in parallel. Each test determines whether the current sequence of process observations is consistent with the null hypothesis versus an alternative hypothesis. The first four tests are: (SPRT 1) the positive-mean test, (SPRT 2) the negative-mean test, (SPRT 3) the nominal-variance test, and (SPRT 4) the inverse-variance test. For the positive-mean test, the signal data for the corresponding alternative hypothesis, $H_1$, adheres to a Gaussian PDF with mean +M and variance $\sigma^2$. For the negative-mean test, the signal data for the corresponding alternative hypothesis, $H_2$, adheres to a Gaussian PDF with mean −M and variance $\sigma^2$. For the nominal-variance test, the signal data for the corresponding alternative hypothesis, $H_3$, adheres to a Gaussian PDF with mean 0 and variance $V\sigma^2$ (with scalar factor V). For the inverse-variance test, the signal data for the corresponding alternative hypothesis, $H_4$, adheres to a Gaussian PDF with mean 0 and variance $\sigma^2/V$.

The final two tandem SPRT tests are performed not on the raw inferential variables as above, but on the first difference function of the inferential variable. For discrete time series, the first difference function (i.e. difference between each observation and the observation preceding it) gives an estimate of the numerical derivative of the time series. During uninteresting time periods, the observations in the first difference function are a nominally stationary random process centered about zero. If an upward or downward trend suddenly appears in the signal, SPRTs number 5 and 6 observe an increase or decrease, respectively, in the slope of the inferential variable.

For example, if there is a decrease in the value of the inferential variable, SPRT alarms are triggered for SPRTs 2 and 6. SPRT 2 generates a warning because the sequence of raw observations drops with time. And SPRT 6 generates a warning because the slope of the inferential variable changes from zero to something less than zero. The advantage of monitoring the mean SPRT and slope SPRT in tandem is that the system correlates the SPRT readings from the six tests and determines if the component has failed. For example, if the signal levels off to a new stationary value (or plateau), the alarms from SPRT 6 cease because the slope returns to zero when the raw signal reaches a plateau. However, SPRT 2 will continue generating a warning because the new mean value of the signal is different from the value prior to the degradation. Therefore, the system correctly identifies that the component has failed.

If SPRTs 3 or 4 generates a warning, the variance of the inferential variable is either increasing or decreasing, respectively. An increasing variance that is not accompanied by a change in mean (inferred from SPRTs 1 and 2 and SPRTs 5 and 6) signifies an episodic event that is "bursty" or "spiky" with time. A decreasing variance that is not accompanied by a change in mean is a common symptom of a failing component that is characterized by an increasing time constant. Therefore, having variance SPRTs available in parallel with slope and mean SPRTs provides a wealth of supplementary diagnostic information.

The SPRT technique provides a quantitative framework that permits a decision to be made between the null hypothesis and the six alternative hypotheses with specified misidentification probabilities. If the SPRT accepts one of the alternative hypotheses, an alarm flag is set.

The SPRT operates as follows. At each time step in a calculation, the system calculates a test index and compares it to two stopping boundaries A and B (defined below). The test index is equal to the natural log of a likelihood ratio ($L_n$), which for a given SPRT is the ratio of the probability that the alternative hypothesis for the test ($H_j$, where j is the appropriate subscript for the SPRT in question) is true, to the probability that the null hypothesis ($H_0$) is true.

$$L_n = \frac{\text{probability of observed sequence } \{Y_n\} \text{ given } H_j \text{ is true}}{\text{probability of observed sequence } \{Y_n\} \text{ given } H_0 \text{ is true}} \quad (1)$$

If the logarithm of the likelihood ratio is greater than or equal to the logarithm of the upper threshold limit [i.e., $\ln(L_n) > \ln(B)$], then the alternative hypothesis is true. If the logarithm of the likelihood ratio is less than or equal to the logarithm of the lower threshold limit [i.e., $\ln(L_n) < \ln(A)$], then the null hypothesis is true. If the log likelihood ratio falls between the two limits, [i.e., $\ln(A) < \ln(L_n) < \ln(B)$], then there is not enough information to make a decision (and, incidentally, no other statistical test could yet reach a decision with the same given Type I and II misidentification probabilities).

Equation (2) relates the threshold limits to the misidentification probabilities $\alpha$ and $\beta$:

$$A = \frac{\beta}{1-\alpha}, B = \frac{1-\beta}{\alpha} \quad (2)$$

where $\alpha$ is the probability of accepting $H_j$ when $H_0$ is true (i.e., the false-alarm probability), and $\beta$ is the probability of accepting $H_0$ when $H_j$ is true (i.e., the missed-alarm probability).

The first two SPRT tests for normal distributions examine the mean of the process observations. If the distribution of observations exhibits a non-zero mean (e.g., a mean of either +M or −M, where M is the pre-assigned system disturbance magnitude for the mean test), the mean tests determine that the system is degraded. Assuming that the sequence $\{Y_n\}$ adheres to a Gaussian PDF, then the probability that the null hypothesis $H_0$ is true (i.e., mean 0 and variance $\sigma^2$) is:

$$P(y_1, y_2, \ldots, y_n | H_0) = \frac{1}{(2\pi\sigma^2)^{n/2}} \exp\left[-\frac{1}{2\sigma^2} \sum_{k=1}^{n} y_k^2\right]. \quad (3)$$

Similarly, the probability for alternative hypothesis $H_1$ is true (i.e. mean M and variance $\sigma^2$) is:

$$P(y_1, y_2, \ldots, y_n | H_1) = \quad (4)$$
$$\frac{1}{(2\pi\sigma^2)^{n/2}} \exp\left[-\frac{1}{2\sigma^2}\left(\sum_{k=1}^{n} y_k^2 - 2\sum_{k=1}^{n} y_k M + \sum_{k=1}^{n} M^2\right)\right].$$

The ratio of the probabilities in (3) and (4) gives the likelihood ratio $L_n$ for the positive-mean test:

$$L_n = \exp\left[-\frac{1}{2\sigma^2} \sum_{k=1}^{n} M(M - 2y_k)\right]. \quad (5)$$

Taking the logarithm of likelihood ratio given by (5) produces the SPRT index for the positive-mean test ($SPRT_{pos}$):

$$SPRT_{pos} = -\frac{1}{2\sigma^2} \sum_{k=1}^{n} M(M - 2y_k) = \frac{M}{\sigma^2} \sum_{k=1}^{n}\left(y_k - \frac{M}{2}\right). \quad (6)$$

The SPRT index for the negative-mean test ($SPRT_{neg}$) is derived by substituting −M for each instance of M in (4) through (6) above, resulting in:

$$SPRT_{neg} = \frac{M}{\sigma^2} \sum_{k=1}^{n}\left(-y_k - \frac{M}{2}\right). \quad (7)$$

The remaining two SPRT tests examine the variance of the sequence. This capability gives the SPRT module the ability to detect and quantitatively characterize changes in variability for processes, which is vitally important for 6-sigma QA/QC improvement initiatives. In the variance tests, the system is degraded if the sequence exhibits a change in variance by a factor of V or 1/V, where V, the pre-assigned system disturbance magnitude for the variance test, is a positive scalar. The probability that the alternative hypothesis $H_3$ is true (i.e., mean 0 and variance $V\sigma^2$) is given by (3) with $\sigma^2$ replaced by $V\sigma^2$:

$$P(y_1, y_2, \ldots, y_n | H_0) = \frac{1}{(2\pi V\sigma^2)^{n/2}} \exp\left[-\frac{1}{2V\sigma^2} \sum_{k=1}^{n} y_k^2\right]. \quad (8)$$

The likelihood ratio for the variance test is given by the ratio of (8) to (3):

$$L_n = V^{-n/2} \exp\left[-\frac{1}{2\sigma^2} \frac{1-V}{V} \sum_{k=1}^{n} y_k^2\right]. \quad (9)$$

Taking the logarithm of the likelihood ratio given in (9) produces the SPRT index for the nominal-variance test ($SPRT_{nom}$):

$$SPRT_{nom} = \frac{1}{2\sigma^2}\left(\frac{V-1}{V}\right)\sum_{k=1}^{n} y_k^2 - \frac{n}{2}\ln V. \quad (10)$$

The SPRT index for the inverse-variance test ($SPRT_{inv}$) is derived by substituting $1/V$ for each instance of V in (8) through (10), resulting in:

$$SPRT_{inv} = \frac{1}{2\sigma^2}(1-V)\sum_{k=1}^{n} y_k^2 + \frac{n}{2}\ln V. \quad (11)$$

The tandem SPRT module performs mean, variance, and SPRT tests on the raw process signal and on its first difference function. To initialize the module for analysis of an inferential variable time-series, the user specifies the system disturbance magnitudes for the tests (M and V), the false-alarm probability ($\alpha$), and the missed-alarm probability ($\beta$).

Then, during the training phase (before the first failure of a component under test), the module calculates the mean and variance of the monitored variable process signal. For most inferential variables the mean of the raw observations for the inferential variable will be nonzero; in this case the mean calculated from the training phase is used to normalize the signal during the monitoring phase. The system disturbance magnitude for the mean tests specifies the number of standard deviations (or fractions thereof) that the distribution must shift in the positive or negative direction to trigger an alarm. In contrast, the system disturbance magnitude for the variance tests specifies the fractional change of the variance necessary to trigger an alarm.

At the beginning of the monitoring phase, the system sets all six SPRT indices to 0. Then, during each time step of the calculation, the system updates the SPRT indices using (6), (7), (10), and (11). The system compares each SPRT index is then compared to the upper [i.e., $\ln((1-\beta)/\alpha]$ and lower [i.e., $\ln((\beta/(1-\alpha))]$ decision boundaries, with these three possible outcomes:

1. the lower limit is reached, in which case the process is declared healthy, the test statistic is reset to zero, and sampling continues;
2. the upper limit is reached, in which case the process is declared degraded, an alarm flag is raised indicating a sensor or process fault, the test statistic is reset to zero, and sampling continues; or
3. neither limit has been reached, in which case no decision concerning the process can yet be made, and the sampling continues.

The advantages of using a SPRT are twofold:

1. early detection of very subtle anomalies in noisy process variables; and
2. pre-specification of quantitative false-alarm and missed-alarm probabilities.

The present invention uses tandem SPRTs to monitor "derivative SPRTs" in parallel with mean and variance SPRTs that are performed on the time-series associated an inferential variable. The tandem-SPRT approach facilitates determining the onset of hardware degradation of components. Moreover, the onset of "spiky" degradation in components as well as degradation in the sensor that is used to measure the inferential variable can be deduced. Information from the suite of six tandem SPRTs provides a substantially complete and substantially accurate picture of the dynamic reliability of the components under test.

Health Index

Real-time telemetry system 102 enables proactive fault-monitoring for wide classes of mechanisms that can cause processors to fail, hang, or suffer performance degradation. A global health index (HI) for a monitored system is computed based on the monitored telemetry signals. In one embodiment of the present invention, the HI is 1.0 for a system displaying normal signature patterns. If any of the monitored telemetry signals (or correlation patterns among multiple telemetry signals) indicates the incipience or onset of anomalies associated with the probability of failure, the HI is set to a value less than 1.0 (the higher the probability of failure, the closer HI is to 0). Note that the modes of failure in parallel-processing system 100 can include processor-attach problems, power-supply degradation, cracked canary-balls on solder joints, thermal anomalies because of fan degradation, obstructed coolant flow channels, and "software aging" effects (including memory leaks or resource contention issues).

In one embodiment of the present invention, the HI is a function of a risk index (RI). In this embodiment, the RI is calculated based on the number of SPRT alarms generated by health monitor 106. If the RI is greater than 0, there is an increased probability that the parallel-processing system may fail. Note that in this embodiment, the RI is bounded between 0 and 1. In one embodiment of the present invention, the HI is 1−RI. Note that the HI can be computed using other functions of the RI or from a statistic other than the RI which indicates the probability of failure for the parallel-processing system.

In one embodiment of the present invention, the RI is the slope of a mean cumulative function (MCF). In this embodiment, the MCF is the cumulative total number of SPRT alarms over a given time period. Since the arrival times of SPRT alarms can be "bursty" or "spiky," one embodiment of the present invention computes the slope of the MCF using a predetermined time-window size. If the RI is increasing (i.e. the slope of the MCF function is increasing) as a function of time, then the parallel-processing system is at higher risk of degrading. Note that the slope of the MCF function is constant for a system that is not at risk of failing or that is not degrading.

In one embodiment of the present invention, if the telemetry signals return to their expected values, the system resets the health index to 1.

In one embodiment of the present invention, the health index is generated for a first subset of computing nodes within the parallel-processing system based on the health index of other subsets of computer nodes within the parallel-processing system. In this embodiment, multiple subsets of computing nodes executing multiple parallel-computing applications within the parallel-processing system are monitored concurrently.

Checkpointing

In one embodiment of the present invention, when HI=1, a minimal value of F is employed for checkpointing frequency. If any monitored parameters cause HI to decrease below 1, then F is increased. In one embodiment of the present invention, F is the monotonic increasing function 1/HI. Note that this function is used up to the point where further increases in F would eliminate the benefit of parallelism.

Figure 2:
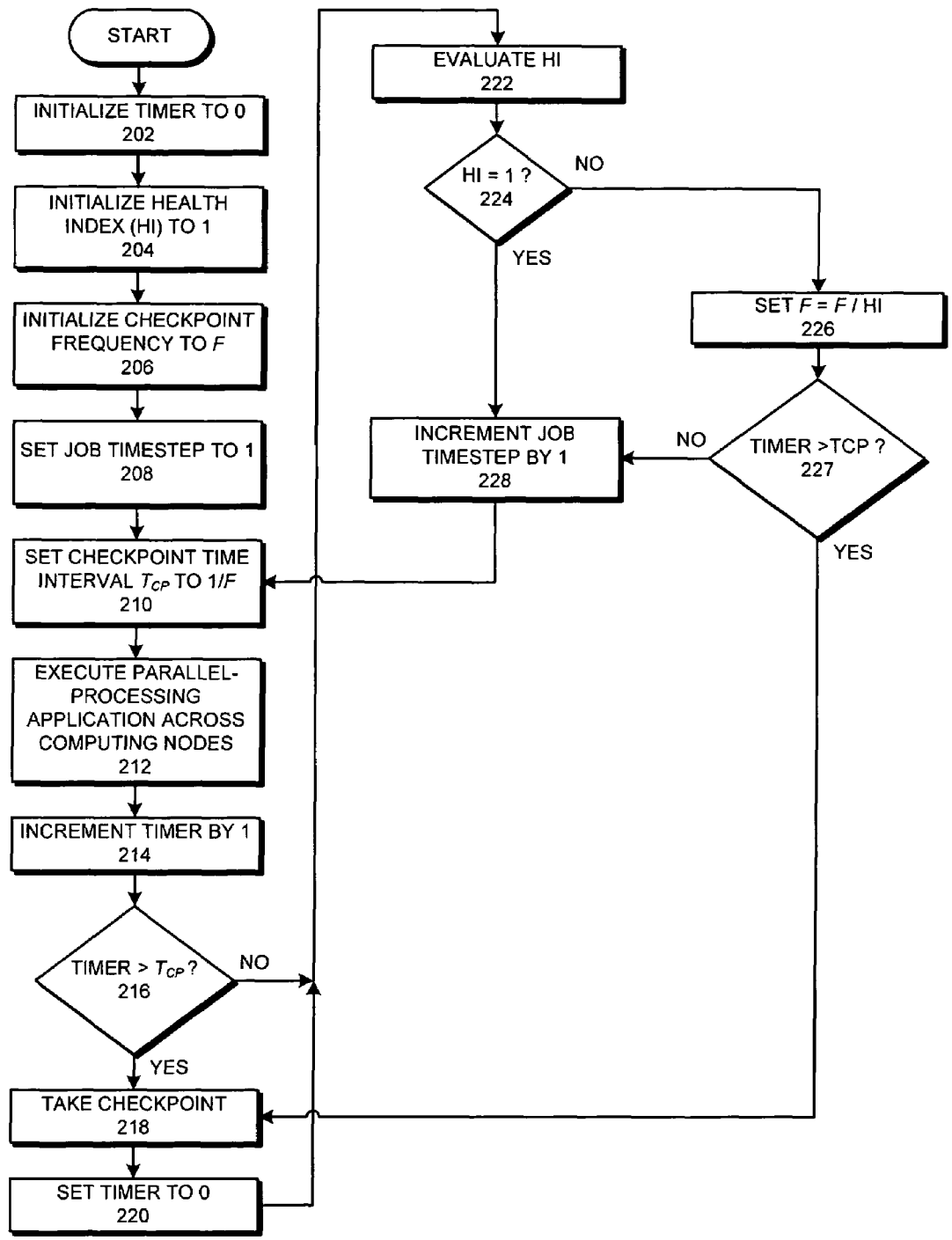
FIG. 2 presents a flow chart illustrating process of checkpointing in accordance with an embodiment of the present invention.

FIG. 2 presents a flow chart illustrating process of checkpointing in accordance with an embodiment of the present invention. The process begins when the system initializes: the checkpoint timer to 0 (step 202); the health index (HI) to 1 (step 204); the checkpoint frequency to F (step 206); and the job timestep to 1 (step 208).

Next, the system sets the checkpoint time interval $T_{CP}$ to 1/F (step 210). The system then executes the parallel-processing application across the computing nodes (step 212), and increments the checkpoint timer by 1 time unit (step 214).

If the checkpoint timer is greater than $T_{CP}$, the system takes a checkpoint of the parallel-processing application (step 218) and sets the checkpoint timer to 0 (step 220). If the checkpoint timer is not greater than $T_{CP}$, (step 216—NO) or after setting the checkpoint timer to 0 (step 220), the system evaluates the health index (step 222). If the health index does not equal 1 (step 224—No), the system sets F to F/HI (step 226). If the checkpoint timer is greater than $T_{CP}$ (step 227), the system returns to step 218.

If the health index equals to 1 (step 224—yes) or if the checkpoint timer is not greater than $T_{CP}$ (step 227), the system increments the job timestep by 1 (step 228) and returns to step 210.

In one embodiment of the present invention, the system uses the checkpoint to restore the state of the parallel processing system to the state of the last checkpoint. The system then resumes execution of the parallel computing application from the restored state.

In one embodiment of the present invention, prior to resuming execution from a checkpoint, the system removes failed components from the system. Note that instead of removing the failed components, the system can replace a component (by substituting redundant components for failed components) or repair a component. Hence, the health index can return to a higher value (i.e. low probability of system failure), since the failed components have been removed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing fault-tolerance in a parallel-processing system, comprising:
    executing a parallel-computing application in parallel across a subset of computing nodes within the parallel-processing system;
    monitoring telemetry signals within the parallel-processing system;
    analyzing the monitored telemetry signals to determine if the probability that the parallel-processing system will fail is increasing by:
        using the monitored telemetry signals to generate a health index, wherein prior to executing the parallel-computing application, the method further comprises initializing the health index to 1, which indicates that the parallel-processing system is healthy, wherein the probability that the parallel-processing system will fail increases as the health index approaches 0; and
        determining if the health index indicates that the probability that the parallel-processing system will fail is increasing; and
    if so, increasing the frequency at which the parallel-computing application is checkpointed, wherein a checkpoint includes the state of the parallel-computing application at each computing node within the parallel-processing system.

2. The method of claim 1, wherein increasing the frequency at which the parallel-computing application is checkpointed involves increasing the frequency by a factor which is inversely proportional to the value of the health index.

3. The method of claim 1, wherein the method further comprises:
    determining if a checkpoint time interval has elapsed; and
    if so, performing a checkpointing operation to save the state of the parallel-computing application.

4. The method of claim 1, wherein if the parallel-processing system fails, the method further comprises:
    using the checkpoint to restore the state of the parallel-processing system to the state of the last checkpoint; and
    resuming execution of the parallel-computing application from the restored state.

5. The method of claim 1, wherein the telemetry signals can include hardware variables and/or software variables.

6. The method of claim 5, wherein the software variables include load metrics, CPU utilization, idle time, memory utilization, disk activity, transaction latencies, and other performance metrics reported by the operating system.

7. The method of claim 5, wherein the hardware variables include temperature and voltage.

8. A computer-readable storage medium storing instructions that when executed by a computer cause the computer to perform a method for providing fault-tolerance in a parallel-processing system, the method comprising:
    executing a parallel-computing application in parallel across a subset of computing nodes within the parallel-processing system;
    monitoring telemetry signals within the parallel-processing system;
    analyzing the monitored telemetry signals to determine if the probability that the parallel-processing system will fail is increasing by;
        using the monitored telemetry signals to generate a health index, wherein prior to executing the parallel-computing application, the method further comprises initializing the health index to 1, which indicates that the parallel-processing system is healthy, wherein the probability that the parallel-processing system will fail increases as the health index approaches 0; and
        determining if the health index indicates that the probability that the parallel-processing system will fail is increasing; and
    if so, increasing the frequency at which the parallel-computing application is checkpointed, wherein a checkpoint includes the state of the parallel-computing application at each computing node within the parallel-processing system.

9. The computer-readable storage medium of claim 8, wherein increasing the frequency at which the parallel-computing application is checkpointed involves increasing the frequency by a factor which is inversely proportional to the value of the health index.

10. The computer-readable storage medium of claim 8, wherein the method further comprises:
    determining if a checkpoint time interval has elapsed; and
    if so, performing a checkpointing operation to save the state of the parallel-computing application.

11. The computer-readable storage medium of claim 8, wherein if the parallel-processing system fails, the method further comprises:
    using the checkpoint to restore the state of the parallel-processing system to the state of the last checkpoint; and
    resuming execution of the parallel-computing application from the restored state.

12. The computer-readable storage medium of claim 8, wherein the telemetry signals can include hardware variables and/or software variables.

13. The computer-readable storage medium of claim 12, wherein the software variables include load metrics, CPU utilization, idle time, memory utilization, disk activity, transaction latencies, and other performance metrics reported by the operating system.

14. The computer-readable storage medium of claim 12, wherein the hardware variables include temperature and voltage.

15. An apparatus that provides fault-tolerance in a parallel-processing system, comprising:
- an execution mechanism configured to execute a parallel-computing application in parallel across a subset of computing nodes within the parallel-processing system;
- a health-monitoring mechanism configured to monitor telemetry signals within the parallel-processing system;
- a checkpointing mechanism configured to:
  - analyze the monitored telemetry signals to determine if a probability that the parallel-processing system will fail is increasing by:
    using the monitored telemetry signals to generate a health index, wherein prior to executing the parallel-computing application, the checkpointing mechanism is farther configured to initialize the health index to 1, which indicates that the parallel-processing system is healthy, wherein the probability that the parallel-processing system will fail increases as the health index approaches 0; and
    determining if the health index indicates that the probability that the parallel-processing system will fail is increasing; and
  - if so, to increase the frequency at which the parallel-computing application is checkpointed, wherein a checkpoint includes the state of the parallel-computing application at each computing node within the parallel-processing system.

* * * * *

UNITED STATES PATENT AND TRADEMARK OFFICE
CERTIFICATE OF CORRECTION

| | |
|---|---|
| PATENT NO. | : 7,571,347 B2 |
| APPLICATION NO. | : 11/385429 |
| DATED | : August 4, 2009 |
| INVENTOR(S) | : Kenny Gross et al. |

Page 1 of 1

It is certified that error appears in the above-identified patent and that said Letters Patent is hereby corrected as shown below:

In claim 1 (at column 9, line 50), please replace the word "the" with the word --a-- so that the line reads: "a probability that the parallel-processing system will".

In claim 8 (at column 10, line 32), please replace the word "the" with the word --a-- so that the line reads: "a probability that the parallel-processing system will".

In claim 15 (at column 12, line 4), please replace the word "farther" with the word --further--.

Signed and Sealed this

Twenty-ninth Day of September, 2009

David J. Kappos
*Director of the United States Patent and Trademark Office*